(12) United States Patent
Enrile Medina et al.

(10) Patent No.: US 9,097,326 B2
(45) Date of Patent: Aug. 4, 2015

(54) HYDRAULIC OIL-DRIVEN STRUCTURAL SUPPORT ROTATING MECHANISM

(75) Inventors: Juan Enrile Medina, Seville (ES); Gustavo Rodriguez Carnero, Madrid (ES); Justo Albarran Ligero, Huelva (ES)

(73) Assignee: ABENGOA SOLAR NEW TECHNOLOGIES, S.A., Seville (ES)

( * ) Notice: Subject to any disclaimer, the term of this patent is extended or adjusted under 35 U.S.C. 154(b) by 44 days.

(21) Appl. No.: 13/996,883

(22) PCT Filed: Dec. 19, 2011

(86) PCT No.: PCT/ES2011/070878
§ 371 (c)(1),
(2), (4) Date: Sep. 30, 2013

(87) PCT Pub. No.: WO2012/085316
PCT Pub. Date: Jun. 28, 2012

(65) Prior Publication Data
US 2014/0013879 A1    Jan. 16, 2014

(30) Foreign Application Priority Data
Dec. 23, 2010 (ES) .................................. 201031929

(51) Int. Cl.
*F16H 21/44* (2006.01)
*F16B 15/06* (2006.01)
(Continued)

(52) U.S. Cl.
CPC ................ *F16H 21/44* (2013.01); *F16B 15/06* (2013.01); *F24J 2/542* (2013.01); *F24J 2/38* (2013.01);
(Continued)

(58) Field of Classification Search
CPC ......... Y02E 10/42; Y02E 10/45; Y02E 10/47; F24J 2/14; F24J 2/38; F24J 2/541
USPC ................................... 126/579, 570, 606, 696
See application file for complete search history.

(56) References Cited

U.S. PATENT DOCUMENTS 3,306,134 A * 2/1967 Winiarski ...................... 475/163
4,076,191 A * 2/1978 Binge ......................... 244/172.7
(Continued)

FOREIGN PATENT DOCUMENTS

EP          1 213 427 A2    6/2002
ES          2 322 527 A1    6/2009
(Continued)

OTHER PUBLICATIONS

International Search Report of PCT/ES2011/070878 dated Mar. 29, 2012.

*Primary Examiner* — Avinash Savani
(74) *Attorney, Agent, or Firm* — Lucas & Mercanti, LLP (57) ABSTRACT

The invention relates to a hydraulic oil-driven structural support rotating mechanism comprising at least two hydraulic cylinders for driving the rotational movement of the structural support with respect to at least one axis, selected from vertical, horizontal or a combination of both, and a hollow core, comprising at least one opening on its side surface for the passage of a first and a second pivotable hydraulic cylinder, fixed to the core by means of two parallel vertical shafts, the ends of each hydraulic oil cylinder being fixed by attachment means to a rotating mechanical element selected from a slew ring or bearing, located inside the hollow core to which it is fixed by rotating mechanical element-core attachment means, and attached to the structural support by structural support-rotating mechanical element attachment means.

15 Claims, 6 Drawing Sheets

(51) Int. Cl.
*F24J 2/54* (2006.01)
*F24J 2/38* (2014.01)

(52) U.S. Cl.
CPC ... *F24J 2002/5441* (2013.01); *F24J 2002/5482* (2013.01); *Y02E 10/47* (2013.01); *Y10T 74/1892* (2015.01)

(56) References Cited

U.S. PATENT DOCUMENTS

| | | | |
|---|---|---|---|
| 4,141,626 A * | 2/1979 | Treytl et al. | 359/846 |
| 4,185,615 A * | 1/1980 | Bottum | 126/601 |
| 4,328,789 A * | 5/1982 | Nelson | 126/579 |
| 4,798,949 A * | 1/1989 | Wilcox et al. | 250/203.6 |
| 6,123,067 A | 9/2000 | Warrick | |
| 2006/0096586 A1 | 5/2006 | Hayden | |
| 2009/0173335 A1 * | 7/2009 | Wanag | 126/570 |

FOREIGN PATENT DOCUMENTS

| | | |
|---|---|---|
| ES | 2 332 117 A1 | 1/2010 |
| ES | 2 332 744 T3 | 2/2010 |
| FR | 2 530 745 A1 | 1/1984 |

* cited by examiner

HYDRAULIC OIL-DRIVEN STRUCTURAL SUPPORT ROTATING MECHANISM

CROSS REFERENCE TO RELATED APPLICATION

This Application is a 371 of PCT/ES2011/070878 filed on Dec. 19, 2011, which claimed the priority of Spanish Patent Application No. P201031929 filed on Dec. 23, 2010, both applications are incorporated herein by reference in their entirety.

FIELD OF THE INVENTION

The present invention is encompassed within the field of hydraulic oil-driven rotating mechanisms, and more specifically, in the field of solar trackers for photovoltaic applications (flat panels, thin film, concentration modules, etc.) and thermosolar applications (heliostats, Stirling dishes, etc.) for rotation on one or two axes: azimuth and/or elevation.

BACKGROUND OF THE INVENTION

Currently there are many solar panel support structure rotating and support mechanisms, both solar collectors and photovoltaic cells being understood as solar panels.

Among the most well known and widely used rotating mechanisms are those which allow moving on two axes: the rotational movement of the solar panels on a vertical axis, resulting in an azimuth movement, and the rotational movement on a horizontal axis resulting in a lifting and lowering movement which is also called zenith movement.

There are some hydraulic oil-driven rotating mechanisms for solar trackers comprising three cylinders for achieving the movement in two axes, the azimuth and zenith movement, of the solar panels contained in a structural support, such as that disclosed by EP1213427 which discloses a mechanism with a U-shaped structure attached to the panel support structure making up a parallelepiped, with a ball joint at each attachment point and two hydraulic cylinders attached at both ends to the parallelepiped, and a friction bushing or bearing for rotating the assembly about an attachment shaft for attachment to the V-shaped section responsible for the azimuth movement together with a hydraulic cylinder.

Another mechanism of those mentioned above is that disclosed by U.S. Pat. No. 612,306, which provides a platform for the azimuth movement comprising a framework having four beams inside of which there are located two pivoting hydraulic cylinders connected to two of the corners of the framework, or by ES2322527 which discloses a mechanism of those mentioned above, in which the zenith movement is achieved by driving a pair of hydraulic cylinders, and the azimuth movement is achieved by rotating a ring, driven by a hydraulic motor, attached to a horizontal frame supporting, by means of a plurality of hinges, the solar panel support structure which rotates on a second ring provided with mooring pins.

However, these mechanisms are not compact and they considerably increase the weight of the tracker or system on which they act.

DESCRIPTION OF THE INVENTION

The invention relates to a compact hydraulic oil-driven structural support rotating mechanism, preferably for a solar tracker, and preferably for moving in two axes, which allows moving the some surface as other known solar trackers, but with less weight, less cost, occupying a much smaller space and with a wide operating range.

The hydraulic oil-driven structural support rotating mechanism of the invention comprises at least two hydraulic oil cylinders for driving the rotational movement of structural supports, such as the solar panel structural support, with respect to at least one axis, selected from vertical, horizontal, or a combination of both. It differs from the hydraulic oil-driven mechanisms known up until now in that it comprises a hollow core comprising at least one opening on its side surface for the passage of a first and a second pivotable hydraulic cylinder, fixed to the core by means of two parallel vertical shafts, each cylinder being able to be arranged in the central point with respect to the upper edge and the lower edge of the core, which allows reducing the bending moment.

The ends of each hydraulic oil cylinder are fixed by attachment means to a rotating mechanical element selected from a slew ring or bearing, located inside the hollow core, to which this rotating mechanical element is fixed by attachment means, and attached to the structural support by attachment means.

The fact that the cylinders enter the hollow core allows placing said cylinders closer to the rotation shaft, which allows having a lighter, more compact driving mechanism with a high range of movement up to 230 degrees.

BRIEF DESCRIPTION OF THE DRAWINGS

A set of drawings which aids to better understand the invention and which specifically relates to two embodiments of said invention presented as non-limiting examples thereof is described briefly below.

DETAILED DESCRIPTION OF TWO EMBODIMENTS

As can be seen in FIGS. 1-7, in which two embodiments are shown, the mechanism of the invention comprises:
  hollow cylindrical core, comprising:
    a body (1, 101) with two openings (4, 4', 104, 104') on its side surface for the passage of a first and a second pivotable hydraulic cylinder (5, 6, 105, 106), and
    an upper cover (2, 102) and a lower cover (3, 103), both with a circular hole in their center and optionally two notches (120, 121, 120', 121') configured for fixing and removing the rotation shaft (7, 7', 107, 107') of a first and a second pivotable hydraulic cylinder (5, 6, 105, 106),
  a first and a second pivotable hydraulic cylinder (5, 6, 105, 106), horizontally located with respect to the core, and fixed to the upper cover (2, 102) and lower cover (3, 103) of the core by means of two parallel vertical rotation shafts (7, 7', 107, 107').

The fact that the cylinders enter the hollow core allows placing said cylinders closer to the rotation shaft, which allows having a lighter, more compact driving mechanism with a high range of movement up to 230 degrees.

The azimuth movement with respect to a vertical axis is achieved by rotating one of the rings of the rotating mechanical element, in this case a bearing, with respect to its vertical axis. This bearing comprises a row of balls between two rings, an outer ring (8, 108) and an inner ring (9, 109), one axially moved with respect to the other, such that the inner ring (9, 109) of the bearing is attached by its upper portion to a base platform (16, 116) of a lifting mount (10, 110) by a plurality of attachment means acting as a support for the structural support, and the outer ring (8) of the bearing is attached by its lower portion to the upper cover (2, 102) of the core by a plurality of attachment means.

Figure 1:
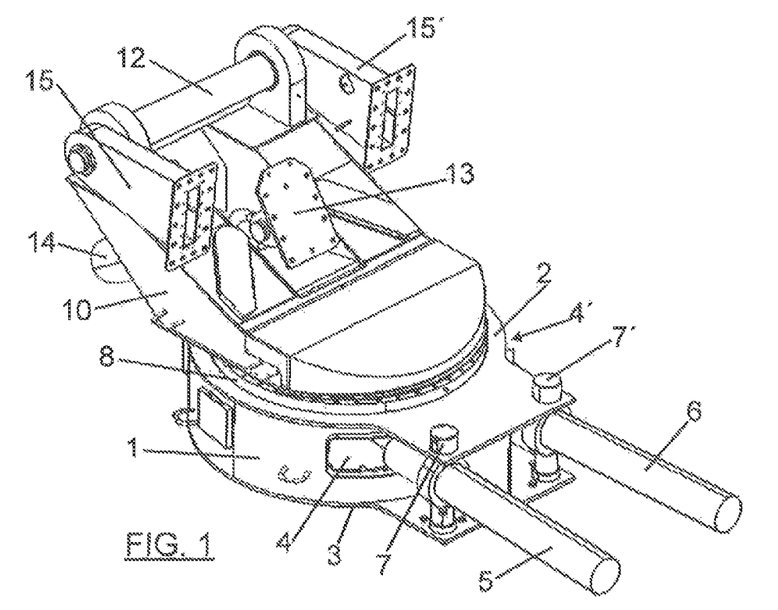
FIG. 1 shows a front perspective view of the rotating mechanism of the invention according to a first embodiment.
Figure 2:
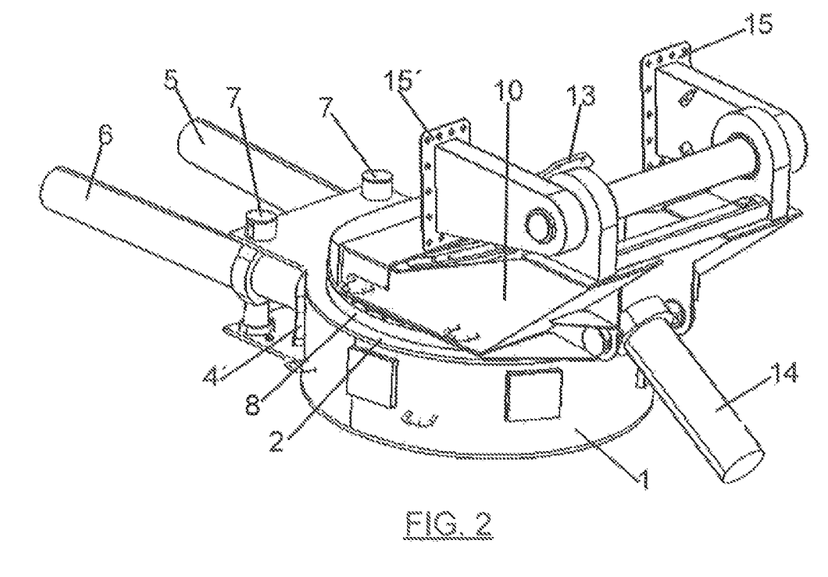
FIG. 2 shows a rear perspective view of the rotating mechanism of the invention according to a first embodiment.
Figure 3:
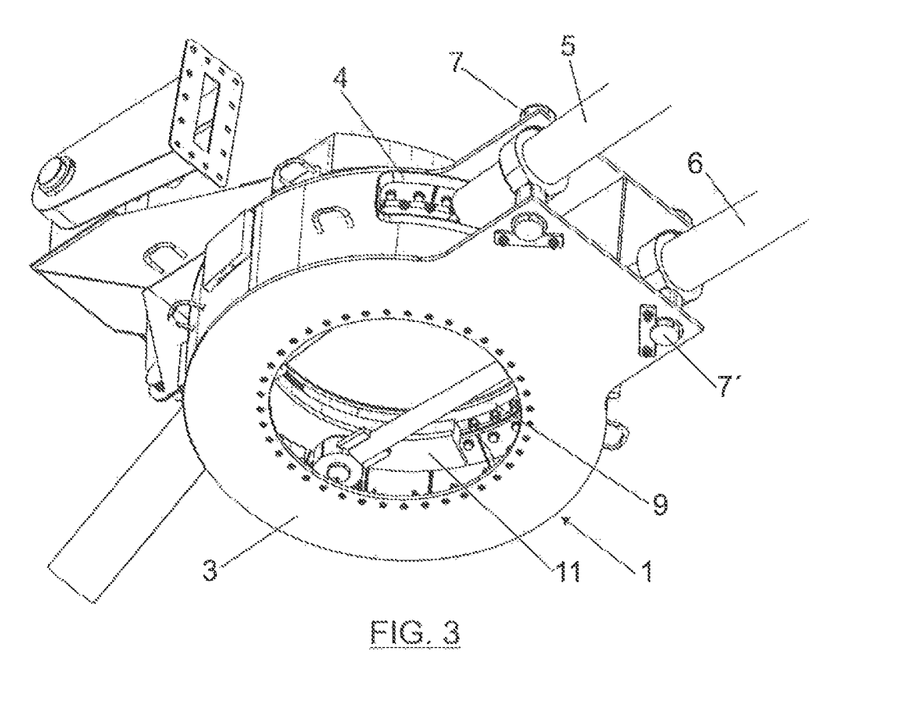
FIG. 3 shows a lower perspective view of the rotating mechanism of the invention, according to a first embodiment.
Figure 7:
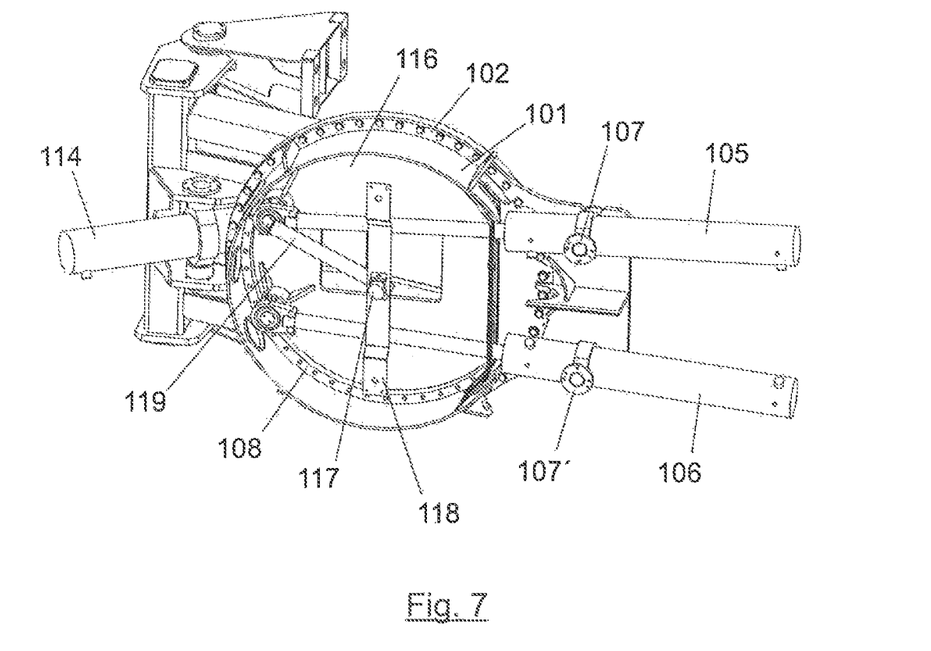
FIG. 7 shows a lower perspective view of the rotating mechanism of the invention, according to a second embodiment without the lower cover of the core.

The hydraulic cylinders (5, 105, 6, 106) can be attached at one of their ends directly to the base (116) of the mount as shown in FIG. 7 of the second embodiment depicted in FIGS. 4-7, such that the base (116) of the mount acts both as attachment means for attaching the bearing to the structural support and as attachment means for attaching the bearing to the first and second cylinders, or by means of an attachment part (11) fixed to the lower portion of the inner ring (9) as shown in FIG. 3 of the first embodiment depicted in FIGS. 1-3.

Figure 4:
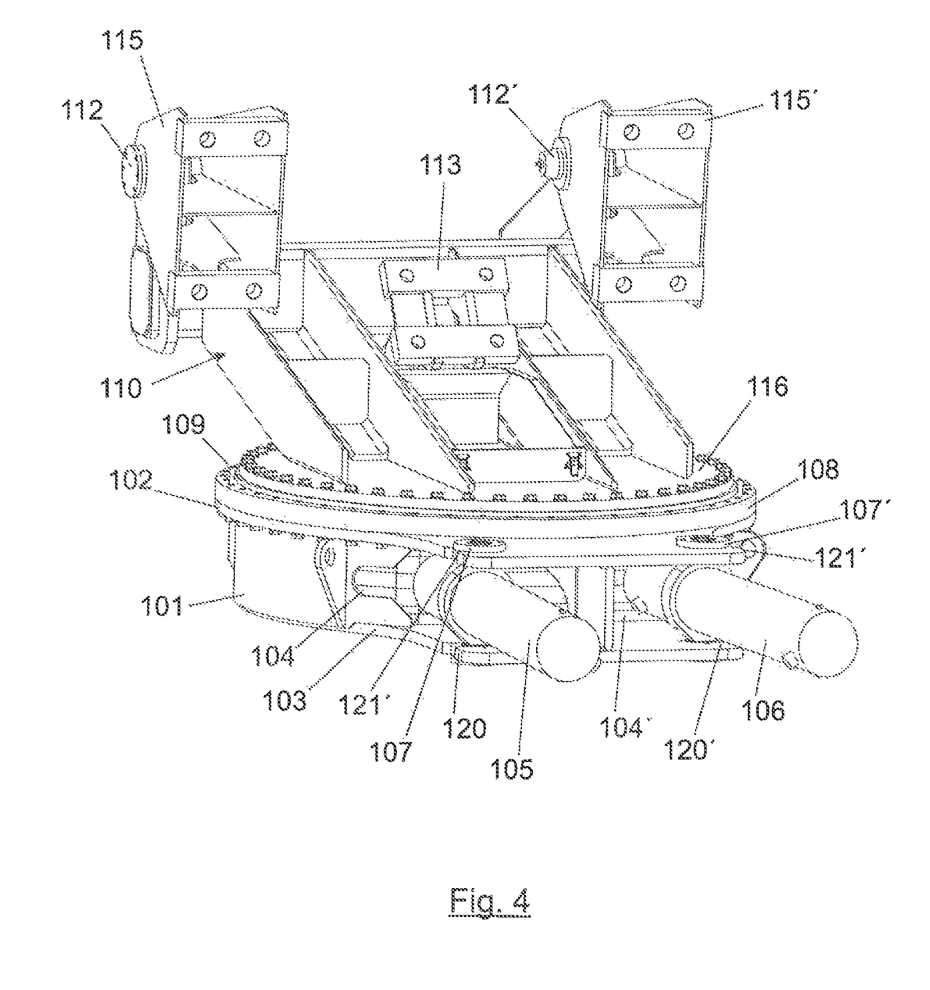
FIG. 4 shows a front perspective view of the rotating mechanism of the invention, according to a second embodiment.
Figure 5:
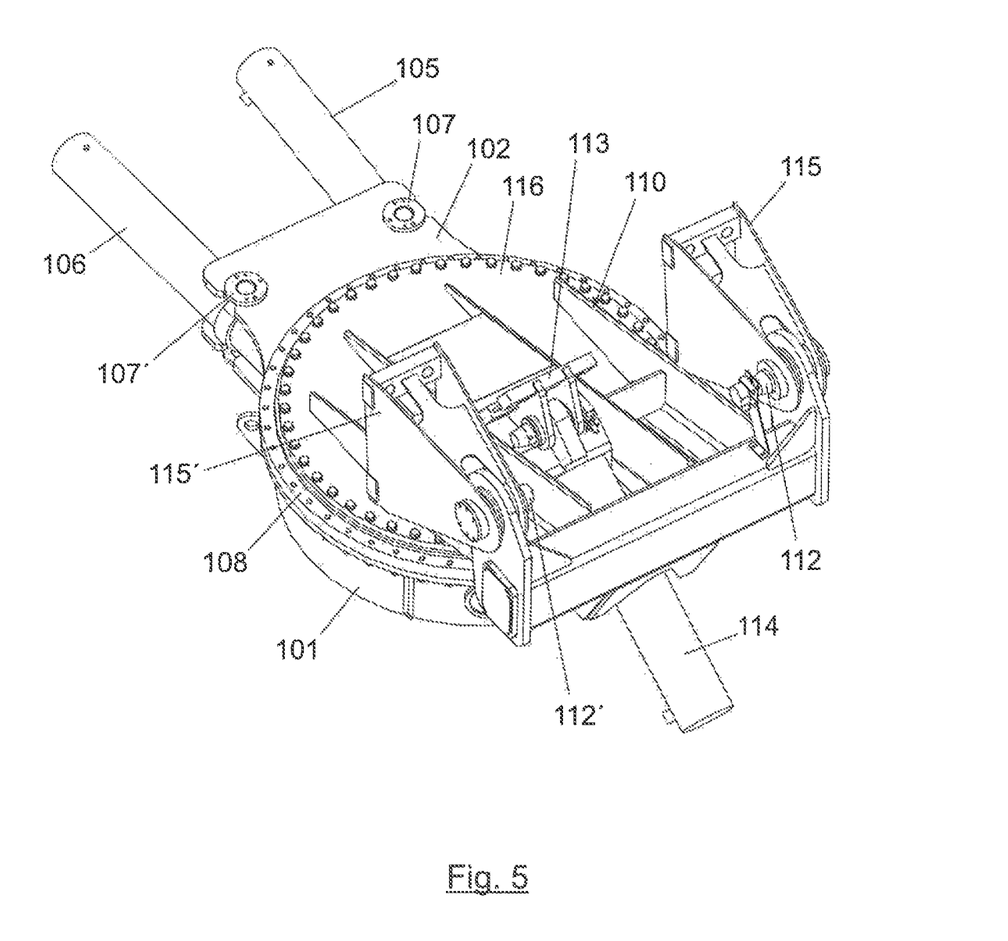
FIG. 5 shows a rear perspective view of the rotating mechanism of the invention according to a second embodiment.
Figure 6:
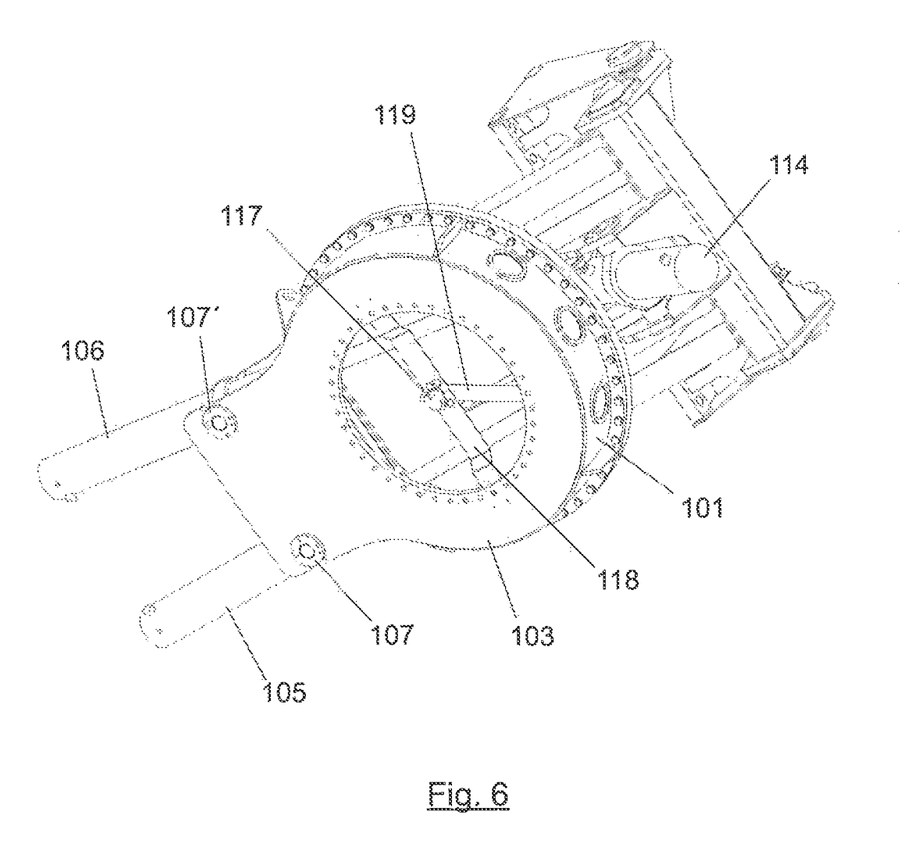
FIG. 6 shows a lower perspective view of the rotating mechanism of the invention, according to a second embodiment.

The lifting and lowering movement of the structural support or rotation with respect to a horizontal axis is obtained as a result of a plurality of rotating means for rotating the structural support which in this case are two articulable side arms (15, 15', 115, 115') which can be attached by a horizontal shaft (12) as shown in FIGS. 1 and 2 of the first embodiment, or each arm (112, 112') can comprise individual horizontal shafts as shown in FIGS. 4 and 5 of the second embodiment, and a central arm (13, 113) driven by a third hydraulic cylinder (14, 114) located below and between the two side arms, ail of them fixed to the lifting mount (10, 110) as the support of said rotating means, the two arms (15, 15", 115, 115") and the central arm (13, 113) being in direct contact with the support structure of the solar panels.

The mechanism can comprise:
 a revolution count encoder (117), fixed to the lower cover of the core (103) by a support (118), and
 a shaft (119) with two ends, to one of which ends the encoder (117) is integrally attached and the other end is attached to the end of one of the first or second cylinders (105, 106) for azimuth movement.

To favor and facilitate accessing the encoder (117) for maintenance or the like, the base (116) of the mount can comprise a hole, which can be covered with a cover, and thus allow accessing the encoder (117) from the upper portion of the mechanism. In addition, the mouths of both elevation and azimuth hydraulic cylinders and hydraulic tubes are oriented such that the wiring does not hinder the rotation or lifting movement.

The lower cover (3, 103) of the core can comprise threaded holes allowing a quick and simple assembly of the mechanism to the pedestal of the solar tracker or the like.

This mechanism is particularly design for application in solar trackers, but extending its use to other fields of the industry requiring similar features is not ruled out.

The invention claimed is:

1. A solar tracker comprising a rotating mechanism for rotating the structural support of a plurality of hydraulic oil-driven solar panels, the rotating mechanism comprising:
 a first pivotable hydraulic cylinder and a second pivotable hydraulic cylinder,
 a hollow core, comprising at least one opening on its side surface configured for the passage of the first and second pivotable hydraulic cylinders,
 two parallel vertical rotation shafts for pivotably attaching each of the first pivotable hydraulic cylinder and the second pivotable hydraulic cylinder to the hollow core,
 a rotating mechanical element located inside the hollow core,
 attachment means for attaching one of the ends of each of the first pivotable hydraulic cylinder and the second pivotable hydraulic cylinder to the rotating mechanical element for driving rotational movement of the rotating mechanical element relative to the hollow core, the rotational movement being about at least one axis selected from vertical, horizontal or a combination of both,
 attachment means for attaching the rotating mechanical element to the core, and
 attachment means for attaching the rotating mechanical element to the structural support.

2. The solar tracker according to claim 1, wherein the attachment means for attaching the rotating mechanical element to the structural support comprise a third hydraulic cylinder for rotating the structural support with respect to a horizontal axis.

3. The solar tracker according to claim 2, wherein the third hydraulic cylinder is part of a lifting mount.

4. The solar tracker according to claim 3, wherein the lifting mount comprises a base.

5. The solar tracker according to claim 1, wherein the rotating mechanical element is an element selected from a slew ring or bearing.

6. The solar tracker according to claim 5, wherein the rotating mechanical element is a bearing comprising a row of balls between two rings, an outer ring and an inner ring, one axially moved with respect to the other, wherein:
 the inner ring of the bearing is attached:
  to the support of a plurality of rotating means for rotating the structural support by a plurality of attachment means, and
  to an end of the first and second hydraulic cylinders for driving rotation with respect to the vertical axis of rotation of the bearing, by means of a plurality of attachment means, and
 the outer ring of the bearing is attached by its lower portion to the hollow core by a plurality of attachment means.

7. The solar tracker according to claim 6, wherein the base is the attachment means for attaching the end of the first and of the second hydraulic cylinder to the inner ring of the rotating mechanism.

8. The solar tracker according to claim 6, wherein the attachment means for attaching the end of the first and of the second hydraulic cylinder to the inner ring of the rotating mechanism comprise an attachment part fixed to the lower portion of the inner ring of the bearing by fixing means.

9. The solar tracker according to claim 2, wherein the attachment means for attaching the rotating mechanical element to the structural support further include two articulable side arms and a central arm driven by the third hydraulic cylinder located below and between the side arms, the two side arms and the central arm being attached by attachment means to the structural support.

10. The solar tracker according to claim 9, wherein the two articulable side arms are attached by a horizontal shaft.

11. The solar tracker according to claim 1, wherein the hollow core of the rotating mechanism comprises a body and an upper cover and a lower cover, both with a circular hole in their center.

12. The solar tracker according to claim 11, wherein the upper cover and lower cover of the hollow core of the rotating mechanism comprise two notches, each cover configured for fixing and removing the rotation shaft of the first and second pivotable hydraulic cylinders.

13. The solar tracker according to claim 11, wherein the body of the hollow core of the rotating mechanism is cylindrical.

14. The solar tracker according to claim 11, wherein the body of the hollow core of the rotating mechanism comprises two openings on its side surface for the passage of a first and a second hydraulic cylinder, respectively.

15. The solar tracker according to claim 11, wherein the rotating mechanism comprises a revolution count encoder, fixed to the lower cover of the core by means of a support and integrally attached to one of the ends of a shaft which is attached at the opposite end to the end of one of the first or second cylinders for azimuth movement.

\* \* \* \* \*